(No Model.)
W. W. JACQUES.
TELEPHONY.
No. 392,033. Patented Oct. 30, 1888.
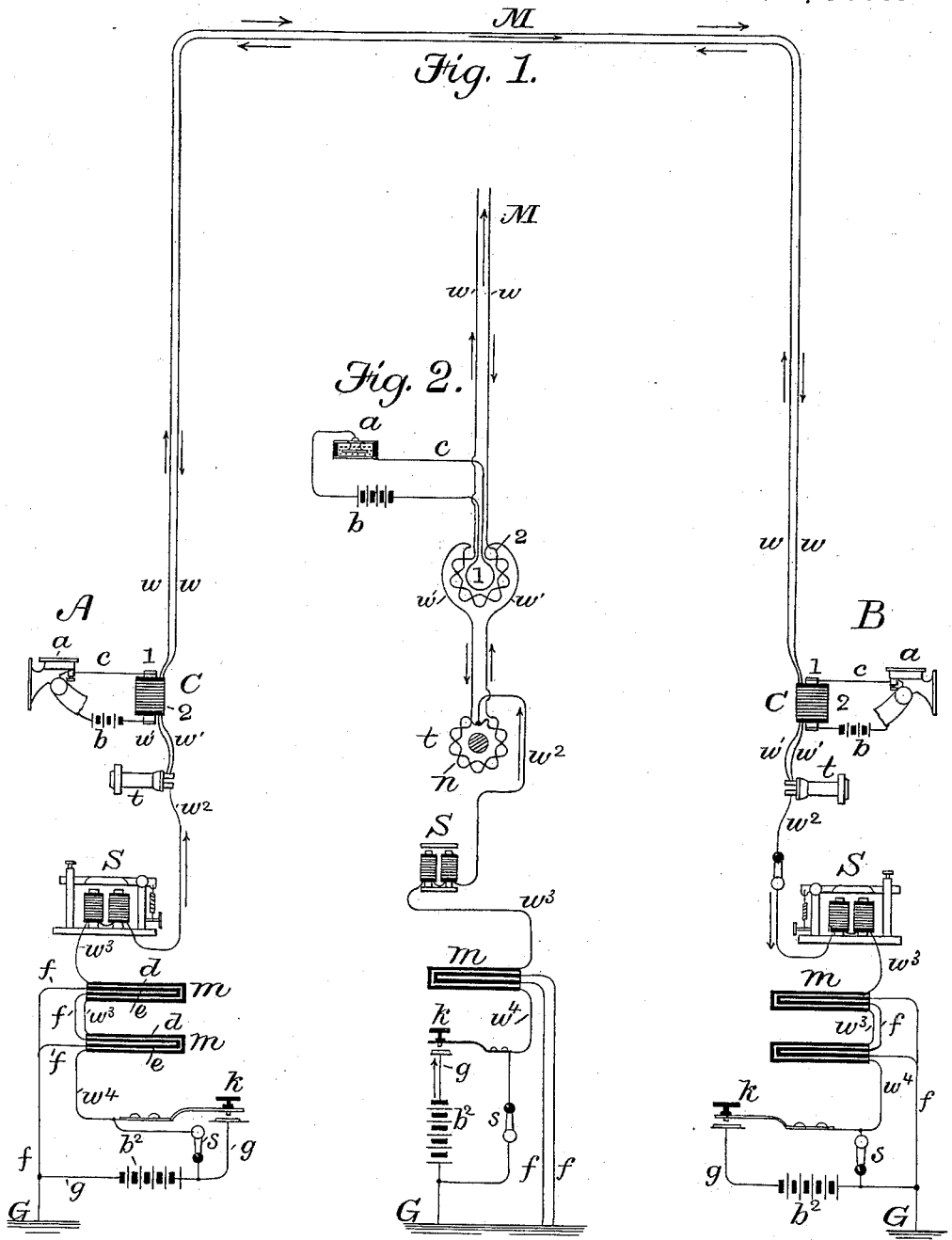
Witnesses.
John T. Jaques.
Geo. Willis Pierce.
Inventor,
W. W. Jacques.

UNITED STATES PATENT OFFICE.

WILLIAM W. JACQUES, OF NEWTON, MASSACHUSETTS.

TELEPHONY.

SPECIFICATION forming part of Letters Patent No. 392,033, dated October 30, 1888.

Application filed September 10, 1888. Serial No. 285,001. (No model.)

*To all whom it may concern:*

Be it known that I, WILLIAM W. JACQUES, residing at Newton, in the county of Middlesex and State of Massachusetts, have invented certain Improvements in Telephony, of which the following is a specification.

This invention relates to systems of electrical transmission of intelligence, and more particularly to multiple systems of that class wherein the same lines may be simultaneously employed for the transmission of telephonic and telegraphic messages. It comprises the use of a metallic or double-wire main circuit, the two wires of which constitute the direct and return wires for the telephonic utilization, and an earth branch at both ends, with which the telegraph sending and receiving instruments are connected. The telephonic organization thus as a whole comprehends receiving and transmitting instruments at each station included in the metallic circuit, while the telegraphic organization as a whole includes the two wires of the metallic circuit, the attached earth branch at both ends, and the telegraphic instruments included in the earth branches. I find that in the use of these organizations I am enabled to operate the telephonic and telegraphic instruments simultaneously without any interference of either one with the other.

I am aware that heretofore it has been proposed to organize systems of multiple circuits for the purpose of economizing telephone-lines, and that the proposed arrangement has been to couple metallic circuits together at the ends, so as to form a third metallic circuit, of which the first and second circuits constitute, respectively, the two sides, and that, furthermore, it has been proposed to extend indefinitely such a system upon the same principle. I am also aware that it has been proposed to employ some of the compound circuits thus constituted from a given number of individual wires for telephonic transmission, reserving others for telegraphy. I have, however, ascertained experimentally that it is, to say the least, difficult to so balance the circuits that there shall be no interference between the two classes of transmission, and that telegraphic signals plainly affect the telephones, which, of course, is in many ways undesirable. By my invention the double transmission is effectuated with absolutely no interference; nor is the operation of the telephone-instruments in the slightest degree impaired by the simultaneous use of the telegraphic appliances. I accomplish these results, first, by including a Muirhead condenser in the earth-branch circuit, and, secondly, by combining the metallic telephone circuit and its telegraphic earth branches with a Muirhead condenser, and by winding the secondary circuit of the transmitter induction-coil, and also the helix of the receiving-telephone, with two wires twisted together and so connected or disposed with respect to the circuit-wires that the telephonic current circulates in both of the wires of these helices in the same direction, or in such a direction as to re-enforce one another, while the telegraphic current passes also through both wires, but in opposite directions, or in such a direction as to oppose and neutralize one another.

It is to be noted that the resistances of the two sides of the metallic circuit should be balanced with respect to the earth branches, and this may, in a manner well understood, be effected by the use of adjustable rheostats. In this way the telephonic instruments are placed in a position neutral to the telegraphic currents, which, passing half over one of the lines of the metallic circuit and half over the other, but using the two practically as one line of conduction, will not affect in any way the telephonic appliances at either end, while any sudden changes (which, owing the varying electrical condition of the line and to other causes, might otherwise interfere with the proper operation of the telephones) are fully compensated, subdued, or absorbed by the introduction of the Muirhead condenser.

It may be proper here to state that by a Muirhead condenser I mean that form of condenser invented and patented by John Muirhead, Jr., No. 208,665, October 1, 1878, for the purpose of duplexing submarine cables, and which is, in fact, a condenser which is also a resistance, and which, with a considerable capacity, furnishes also a continuous and unbroken line of conduction, the resistance and capacity being uniformly distributed with respect to one another. In a line fitted with these appliances and operated in accordance with the terms of my invention, and constituted of about three hundred miles of double wire, I obtained good results by using a condenser having a resistance of six hundred ohms and an electrostatic capacity of about eight microfarads.

In the drawings which illustrate and form a part of this specification, Figure 1 is a diagram of a telephone and telegraph line embodying my invention, and Fig. 2 is a detail diagram of one of the stations thereof.

In the drawings, M is a double-wire circuit extending from station A to station B. At each station, for the purpose of carrying on telephonic communication, is a transmitter, $a$, ordinarily in the circuit $c$ of a local battery, $b$, which also includes the primary helix 1 of an induction-coil, C, through which the said transmitter acts upon the main circuit M. There is also a receiving-telephone, $t$, and these instrumentalities are all that is necessary for the telephonic operation of the line. It may be here stated that as both stations are connected alike it will be sufficient to describe one of them, the letters of reference being also similar.

As more clearly indicated in Fig. 2, the secondary helix 2 of the induction-coil C and the helix $n$ of the receiving-telephone $t$ are both wound with two wires twisted together. It will be understood that by means of this induction-coil the variations of current produced by the operation of the transmitter are induced upon the metallic circuit, of which both of the wires of the secondary helix form a part, and that by means of the receiver the telephonic currents passing in the metallic circuit reproduce the vocal sounds. The telephonic currents traversing the metallic circuits and acting upon the telephone-receiver are indicated by the short arrows, and at any given moment are necessarily traveling in opposite directions in the two wires. The said two wires $w$ are, however, so connected with the two wires of the induction-coil and receiver-helices that the current in both wires is in the same direction, as may be readily seen by tracing the wires in the detail diagram, and as a necessary consequence they re-enforce one another, so that if at any given moment the current in one of the wires is of a direction to increase the magnetism of the cores the current in the other wire also has the same tendency, and vice versa. The metallic circuit is thus electrically responsive in the highest degree to changes caused by the transmitter, and in like manner the telephone-receiver is sensitively responsive to telephonic variations occurring in the metallic circuit.

I will now pass on to the description of the telephonic annex to such a metallic circuit, whereby simultaneous telegraphy is made commercially practical. As hereinbefore stated, the helices 2 and $n$ are each wound with two wires. Two of the ends thereof are of course connected, as shown, with the two entering ends of the metallic circuit. The remaining two ends of the coil nearest to the line constitute the extension of the metallic circuit to the other coil, and the second pair of ends of the final coil may prior to the attachment of the earth branch be united together for the completion of the metallic circuit. These united ends are now at each end of the line connected with a single wire, $w^2$, which leads to the telegraphic receiver S, thence by wire $w^3$ to and through the Muirhead condenser $m$, thence by wire $w^4$ to the signaling-key $k$, and when receiving to earth by switch $s$, battery $b^2$, and wire $g$ to earth at G. The switch $s$ is of course closed when receiving and is open during the manipulation of the key, as shown at station A. The wires $f$ are ground-wires connecting with the earth-plates of the condenser $m$, which, if desired, may, as shown, be in two or more sections connected in series or multiple arc, as may be required in individual cases.

The receiving-instrument S and the condenser $m$ may, if desired, exchange places without materially affecting the operation of the system.

When telegraphic signals are transmitted, the current of the battery $b^2$ flows over the line and through the condenser, also through the telephone-receiver and induction-coil helices, and then over the two wires of the metallic circuit, which, however, as already stated, furnish but one line of conduction. This current is indicated in the drawings by the single long arrows. In passing round the cores of the telephone-instruments, in virtue of the peculiar mode of connection, it traverses the two wires in opposite directions or differentially, its magnetizing effect being thereby nullified, the effect of a portion of the said current in one of the wires being neutralized by the effect of an equal portion of the same current oppositely exerted in the other. This neutralizing effect is aided and intensified by the fact that, as hereinbefore described, the two wires of both coils are twisted together, and thus further equalized. The telegraphic currents have, therefore, no effect upon the telephonic instruments in the metallic circuit at either station, but act upon the telegraphic receiver in the distant earth branch, causing the messages to be reproduced thereupon. By interposing switches $s^2$ in the respective telegraph branches these may of course be disconnected whenever desired.

The key-controlling switches $s$ may, if desired, be so connected as to cut off the battery $b^2$ when closed, as at station B or as at station A the receiving-circuit may be made to include the battery $b^2$.

I have shown the telegraphic battery $b^2$ as being divided, half of it being located at each station, and a condenser also at each station. This mode of connection is sometimes preferable, especially if the main line be of great length; but I have obtained good results by placing the entire battery at one of the terminal stations, and when this is done it is only necessary to provide a condenser at the battery end of the line. Any system of telegraphy can be utilized when the arrangement which I have described is adopted.

Having now described my invention, I claim—

1. In a system of simultaneous telephony and telegraphy, a metallic circuit including telephone-instruments, provided at its ends with earth branches including telegraphic sending and receiving instruments, and a Muirhead condenser, substantially as described.

2. A system of simultaneous telephony and telegraphy comprising a metallic main-line circuit, telephonic receiving and transmitting helices, each being wound with two wires included in the said circuit and so connected therewith that currents flowing in the said circuit traverse both wires in the same direction, an earth branch connected with each end of the said circuit and so united with the two wires of the said helices that currents passing through the said earth branch will traverse the said two wires differentially, telegraphic instruments included in the said earth branch, and a Muirhead condenser also included therein, substantially as and for the purposes described.

3. The combination, at a telephone-station, of telephone receiving and transmitting instruments having their helices each wound with two wires twisted together, both of the said wires being so connected with a telephonic metallic circuit that currents traversing the said circuit will traverse both wires in the same direction with respect to the cores of the said helices, an earth branch of the said metallic circuit connected therewith through both wires of the said helices differentially, as described, and including telegraph-instruments, and a Muirhead condenser also included in said branch, whereby currents traversing the said branch are enabled to traverse the telephone-instrument helices without acting thereon, substantially as described.

4. In a system of simultaneous telephony and telegraphy, the combination of a metallic main-line circuit, telephonic receiving and transmitting helices, each wound with two wires included in the said circuit and connected therewith, so that currents circulating in the said circuit traverse both wires in the same direction, an earth branch connected with each end of the said metallic circuit at a point representing the center of the resistance of the double-wire helices, and so united with the said two wires that currents passing through the said earth branch will traverse the said two wires differentially and over the two wires of the metallic circuit in the same direction, telegraphic instruments included in the said earth branch, and a Muirhead condenser also included therein, substantially as described.

5. A system of simultaneous telephony and telegraphy comprising two main-line wires acting as a metallic circuit for telephonic and together as a single line of double conductivity for telegraphic transmission, telephonic receiving and transmitting helices wound with two wires twisted together and serially connected with the metallic circuit, so that currents circulating therein will re-enforce one another, an earth branch constituting an extension of the telegraphic circuit connected with each end of the said circuit and so united with the two wires of the said helices that currents passing through the said earth branch will traverse the said two wires differentially and neutrally and over the two wires of the metallic circuit in the same direction, telegraphic instruments included in the said earth branch, and a battery and a Muirhead condenser also included therein, all substantially as and for the purposes specified.

In testimony whereof I have signed my name to this specification, in the presence of two subscribing witnesses, this 7th day of September, 1888.

WILLIAM W. JACQUES.

Witnesses:
JOHN T. JAQUES,
GEO. WILLIS PIERCE.